(12) United States Patent
Tachihara et al.

(10) Patent No.: US 6,520,769 B2
(45) Date of Patent: Feb. 18, 2003

(54) WARM-UP APPARATUS FOR FUEL EVAPORATOR

(75) Inventors: Takahiro Tachihara, Saitama (JP); Kouji Miyano, Saitama (JP); Naoyuki Abe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 24 days.

(21) Appl. No.: 09/900,795

(22) Filed: Jul. 6, 2001

(65) Prior Publication Data

US 2002/0004021 A1 Jan. 10, 2002

(30) Foreign Application Priority Data

Jul. 6, 2000 (JP) ........................................ 2000-205745

(51) Int. Cl.[7] .............................................. F23D 21/00
(52) U.S. Cl. ............................ 431/170; 431/5; 431/202
(58) Field of Search ................................ 431/5, 7, 170, 431/202; 422/183

(56) References Cited

U.S. PATENT DOCUMENTS 5,441,401 A * 8/1995 Yamaguro et al. ............. 431/2
6,190,623 B1 * 2/2001 Sanger et al. ................ 422/192
6,383,468 B1 * 5/2002 Schussler et al. ........... 252/373

* cited by examiner

*Primary Examiner*—Henry Bennett
*Assistant Examiner*—Alfred Basichas
(74) *Attorney, Agent, or Firm*—Lahive & Cockfield, LLP (57) ABSTRACT

A warm-up apparatus 1 for a fuel evaporator 2 comprises: a catalyst combustor 20 for catalytically burning exhaust gas from a fuel cell 6 to produce combustion gas and supplying the fuel evaporator which evaporates raw fuel liquid with the produced combustion gas as an evaporation heat source; an exhaust gas passage 1a for transferring exhaust gas to the catalyst combustor; and a combustion gas transferring device 10 including a fuel injection portion 10a and a combustion catalyst 10c, and injecting fuel from the fuel injection portion onto the combustion catalyst, where the fuel is catalytically burned to produce combustion gas, and thereafter transferring the produced combustion gas to the catalyst combustor. The combustion gas transferring device is positioned on one side of said exhaust gas passage.

13 Claims, 4 Drawing Sheets

WARM-UP APPARATUS FOR FUEL EVAPORATOR

FIELD OF THE INVENTION

The present invention relates to a warm-up apparatus for a fuel evaporator. The fuel evaporator (also referred to as a fuel vaporizer) evaporates raw fuel liquid, such as a mixture of methanol and water, and supplies raw fuel gas to a reformer, in which the raw fuel liquid as a raw fuel gas is reformed to produce hydrogen and the produced hydrogen is supplied to a fuel cell.

BACKGROUND OF THE INVENTION

Figure 4A:
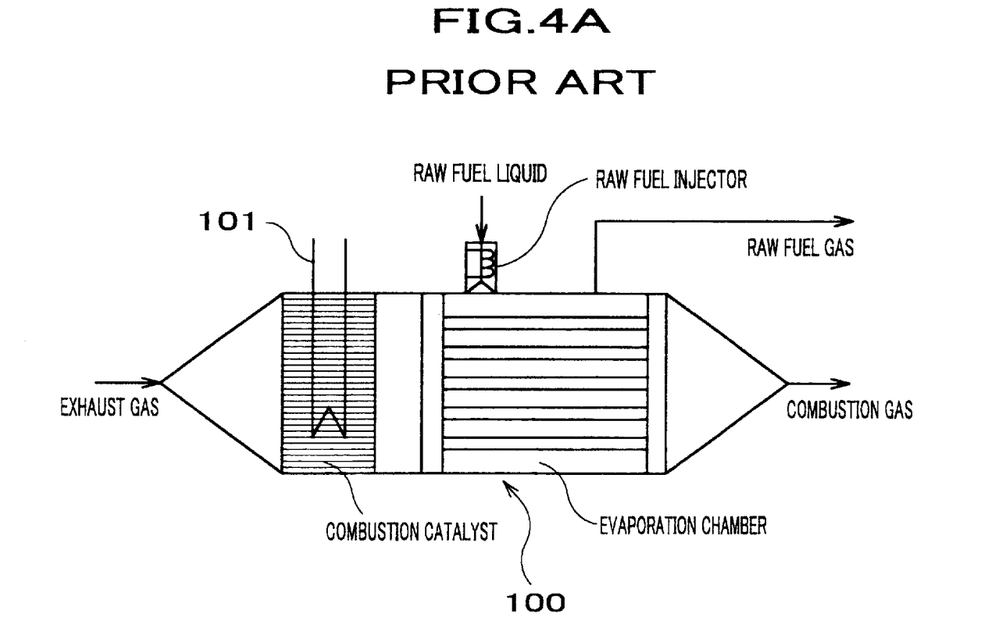
FIG. 4A shows warming-up with the use of an electric heater.
Figure 4B:
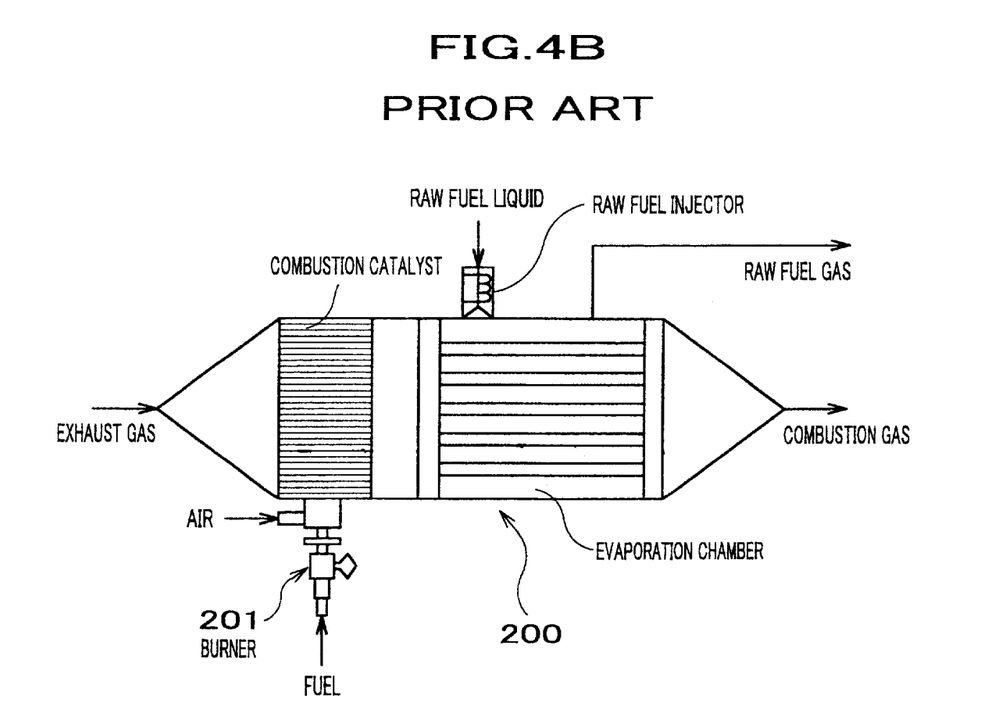
FIG. 4B shows warming-up with the use of a combustion burner.

In a conventional fuel cell system, warm-up apparatuses employing an electric heater 101 shown in FIG. 4A or a combustion burner 201 shown in FIG. 4B are widely known to immediately warm up a fuel evaporator 100 or 200 evaporating raw material to be supplied to a reformer. The raw material is then reformed at the reformer. The warm-up apparatus warms up the fuel evaporator either directly or indirectly. In the indirect heating, gas or liquid is heated by a heat source, such as the electric heater 101 or the combustion burner 201, and the heated gas or liquid is used as a heat transfer medium.

For example, Japanese Laid-open Patent Publication No. Hei 11-86893 discloses a fuel evaporator equipped with a combustion burner. In this fuel evaporator, fuel is burned with the combustion burner to generate heat, and a heat exchanger utilizes the resulting heat for raising the temperature of the raw material to evaporate the raw material.

Further, a warm-up apparatus equipped with a catalyst combustor is known. The catalyst combustor generates a gas for raising the temperature of the raw material. For example, a fuel evaporator disclosed in Japanese Patent Application No. Hei 11-315996 (unpublished) is provided with a catalyst evaporator. And the electric heater 101 shown in FIG. 4A and the combustion burner 201 shown in FIG. 4B are used for the purpose of immediately raising the temperature of the catalyst combustor.

However, when the flow rate of the exhaust gas (also referred to as an "off gas") from the fuel cell becomes greater, electric power consumption becomes greater in the case of heating with the electric heater 101. Meanwhile, in the case of heating with the combustion burner 201, there are problems, such as increasing amount of the exhaust gas of the combustion burner 201 and increasing size of the burner itself.

However, because both of the above warm-up apparatuses are poor in heating efficiency, it takes time for completing the warming-up of the fuel evaporator 100 after actuating or starting the warm-up apparatus.

Further, heating with the combustion burner 201 is liable to burn the raw material at a relatively high temperature and thus to emit toxic substances, such as $NO_x$ (nitrogen oxides).

In order to eliminate the foregoing drawbacks of the prior art, the present invention seeks to provide a warm-up apparatus for a fuel evaporator with small and low electric power consumption, and having an actuation/warm-up system constitution allowing a quick and reliable warming-up operation, and ensuring clean gas emission.

SUMMARY OF THE INVENTION

According to the present invention, there is provided a warm-up apparatus for a fuel evaporator comprising:

a catalyst combustor for catalytically burning exhaust gas from a fuel cell to produce combustion gas and supplying said fuel evaporator which evaporates raw fuel liquid with the produced combustion gas as an evaporation heat source;

an exhaust gas passage for transferring exhaust gas to the catalyst combustor;

a combustion gas transferring device including a fuel injection portion and a combustion catalyst, and injecting fuel from said fuel injection portion onto said combustion catalyst, where the fuel is catalytically burned to produce combustion gas, and thereafter transferring the produced combustion gas to said catalyst combustor, wherein said combustion gas transferring device is positioned on one side of said exhaust gas passage.

With the above constitution of the warm-up apparatus, the following effects can be achieved.

(1) The combustion gas transferring device including a fuel injection portion and a combustion catalyst is positioned on one side of the exhaust gas passage, though which the exhaust gas is transferred to the catalyst combustor, and the combustion gas, which is produced by injecting fuel from the fuel injection portion to the combustion catalyst and thereafter catalytically burning the fuel, is transferred to the catalyst combustor. Therefore, it is possible to carry out low temperature combustion with little $NO_x$ emission, enabling the catalyst combustor to rise to the starting temperature while emitting clean exhaust gas to the outside.

(2) Because the combustion gas transferring device is positioned on one side of the exhaust gas passage and not in the same flow direction of the exhaust gas passage, the combustion catalyst of the combustion gas transferring device is hardly heated by radiation heat transfer from the catalyst combustor. Therefore, backfire toward the exhaust gas passage can be prevented in a reliable manner.

According to another aspect of the present invention, the combustion gas transferring device comprises a swirler generating a gaseous swirl flow with regard to the fuel injected.

Because the combustion gas transferring device comprises a swirler generating a gaseous swirl flow with regard to the fuel injected, fuel can be uniformly atomized and finely dispersed and a uniform fuel/air mixing ratio can be obtained. This results in stable composition of the combustion gas and uniform heat impartment to the following catalyst combustor.

According to another aspect of the present invention, the combustion gas transferring device includes a combustion gas outlet which opens from an upstream of a flow of the exhaust gas toward the catalyst combustor.

Because the combustion gas transferring device includes a combustion gas outlet which opens from an upstream of a flow of the exhaust gas toward the catalyst combustor, it is possible to effectively supply the combustion catalyst of the catalyst combustor with the combustion gas generated at the combustion gas transferring device.

It is preferable that the combustion gas outlet is provided at a position where the combustion catalyst of the combustion gas transferring device is not heated due to radiation heat transfer from a combustion catalyst of the catalyst combustor while the combustion catalyst of the catalyst combustor rises to high temperatures during the steady driving.

It is also preferable that the combustion gas transferring device comprises an injector as the fuel injection portion, an air injection nozzle, the combustion catalyst and a combustion gas outlet.

It is also preferable that the air injection nozzle is a swirler generating a gaseous swirl flow with regard to the fuel injected.

According to another aspect of the present invention, the exhaust gas passage is provided with a cover plate, which extends from a wall of the exhaust gas passage along a flow of the exhaust gas and partly blocks the flow of the exhaust gas.

With such an arrangement of the cover plate, the following effects can be achieved.

(1) Providing the cover plate prevents the flow of the exhaust gas from being drawn toward the combustion gas transferring device. Therefore, the exhaust gas does not burn due to contact with the combustion catalyst of the combustion gas transferring device.

(2) Because the cover plate extends from the wall of the exhaust gas passage along the flow of the exhaust gas, the cross-sectional area of the exhaust gas passage is substantially constant throughout the lengthwise direction. Therefore, pressure loss of the exhaust gas passage becomes smaller and a drift flow hardly occurs, leading to smooth flow of the exhaust gas toward the catalyst combustor.

Further, in comparison with the constitution without the cover plate, the combustion catalyst of the combustion gas transferring device is not subject to radiation heat transfer from the combustion catalyst of the catalyst combustor during the steady driving. For this reason, backfire due to the exhaust gas to be burned by the combustion catalyst of the combustion gas transferring device can be prevented in a more reliable manner.

It is preferable that the combustion catalyst of the combustion gas transferring device is based on, as a substrate, an expanded metal made of iron-chromium made stainless steel.

It is preferable that a fuel injection device is provided on one side of said exhaust gas passage.

It is also preferable that that the fuel injection device is capable of directly injecting fuel onto the combustion catalyst of the catalyst combustor when the combustion catalyst is thermally activated.

It is also preferable that the fuel injection device comprises an injector, an air injection nozzle, and a fuel outlet to the exhaust gas passage.

Further, it is preferable that the air injection nozzle is a swirler generating a gaseous swirl flow with regard to the fuel injected.

Further, it is also preferable that an inlet of the catalyst in the form of a layer is provided with a stainless steel made perforated plate for regulating a flow of the combustion gas while uniformly transferring the combustion gas from the combustion gas transferring device into the catalyst layer.

BRIEF DESCRIPTION OF THE DRAWINGS

Preferred embodiments of the present invention will be described below, by way of example only, with reference to the accompanying drawings, in which:

FIGS. 4A and 4B show a conventional warm-up apparatus for a fuel evaporator, respectively, in which

DESCRIPTION OF THE PREFERRED EMBODIMENT

Figure 1:
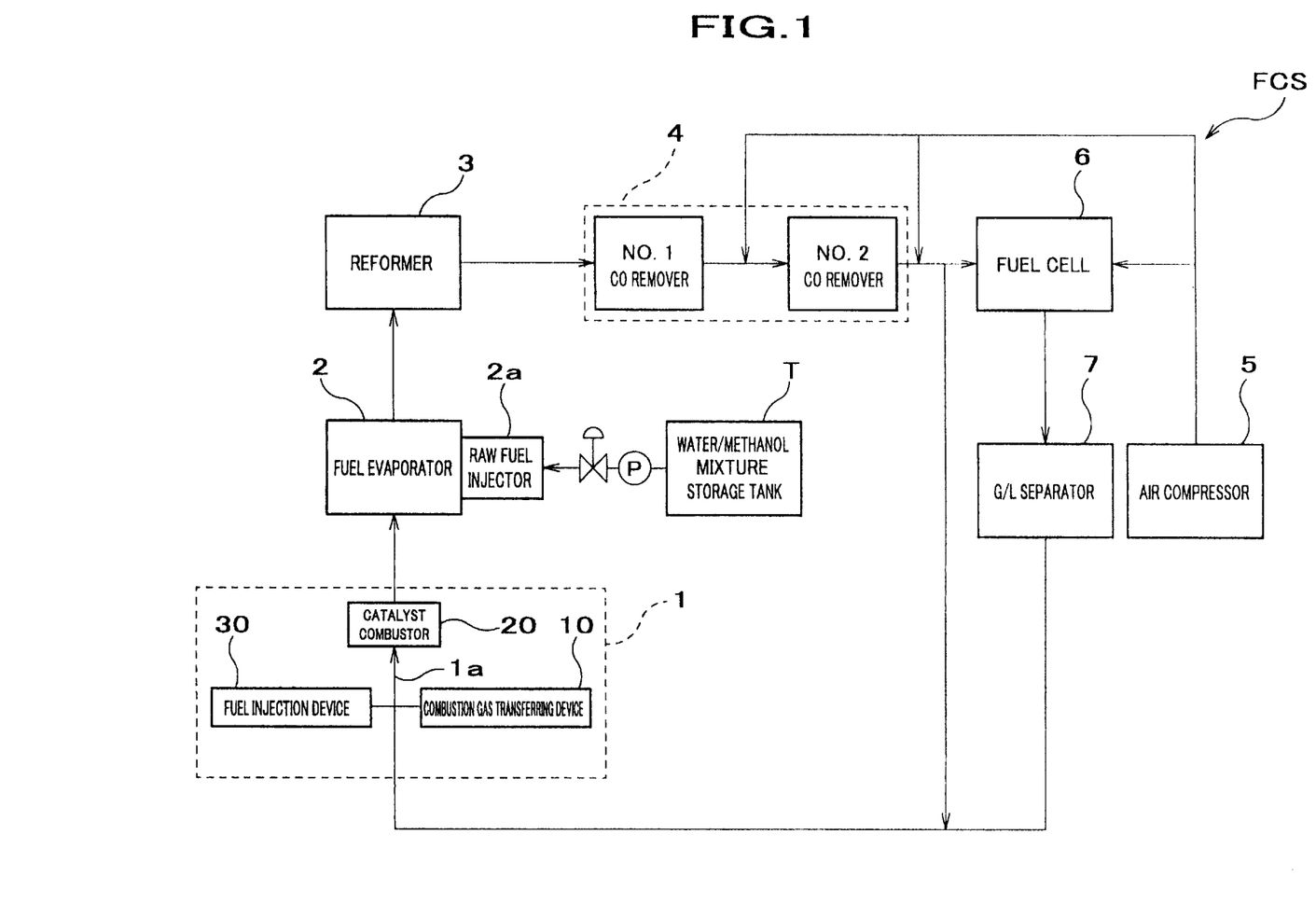
FIG. 1 is a block diagram illustrating the overall structure of a fuel cell system equipped with a warm-up apparatus for a fuel evaporator according to the present invention.

Firstly, with reference to FIGS. 1 and 2, the overall arrangement of a fuel cell system FCS, to which is adapted a warm-up apparatus for a fuel evaporator according to the present invention, will be described.

The fuel cell system FCS mounted on a vehicle comprises:

a warm-up apparatus 1 for a fuel evaporator 2, the warm-up apparatus 1 mainly including an exhaust gas passage 1a, a combustion gas transferring device 10 positioned on one side of the exhaust gas passage 1a, a fuel injection device 30 also positioned on one side of the exhaust gas passage 1a and injecting fuel, such as methanol, and a catalyst combustor 20, and the warm-up apparatus catalytically burning exhaust gas or fuel supplied from the fuel cell 6 at the catalyst combustor 20 and, for example at a start, producing combustion gas to be used as an evaporation heat source for the fuel evaporator 2;

the fuel evaporator 2 for evaporating raw fuel liquid, such as a mixture of water and methanol, in the evaporation chamber 2b, with the use of combustion gas generated at the warm-up apparatus 1 as an evaporation heat source;

a reformer 3 for reacting raw fuel gas, which is produced by evaporating the raw fuel liquid at the fuel evaporator 2, over a solid catalyst to produce a fuel gas containing hydrogen;

a CO remover 4 for removing carbon monoxide from the fuel gas produced at the reformer 3;

the fuel cell 6 for reacting hydrogen in the fuel gas that is supplied from the CO remover 4 with oxygen in the air that is compressed by an air compressor 5 as an oxidant supplying means so as to generate electricity; and a gas/liquid separator 7 for separating and removing moisture from the exhaust gas supplied from the fuel cell.

Operation of the above fuel cell system FCS will be described.

A certain amount of raw fuel liquid, such as a mixture of methanol and water, is pumped from a storage tank T to the fuel evaporator 2. A raw fuel injector 2a injects the raw fuel liquid supplied to the fuel evaporator 2 onto outer surfaces of a large number of U-shaped heating medium tubes 2p fixed to a tube plate 2c within an evaporation chamber 2b so as to evaporate the raw fuel liquid and produce raw fuel gas.

In the steady driving mode, the evaporation heat source of the fuel evaporator 2 is secured in such a way that the exhaust gas containing hydrogen and oxygen remaining unreacted at the hydrogen pole and the oxygen pole of the fuel cell 6 is catalytically burned in the catalyst combustor below the evaporation chamber 2b of the fuel evaporator 2 (see FIG. 2) and that necessary heat quantity is obtained from the generated combustion gas.

Meanwhile, when no evaporation heat source exists at a start and the like, the combustion gas transferring device 10 injects fuel, such as methanol, onto the electrically heated combustion catalyst 10c (see FIG. 2) so that the fuel is catalytically burned to produce combustion gas, and the heat quantity required for warming-up the catalyst combustor 20 is obtained from the produced combustion gas. Further, the heat quantity required for warming-up the catalyst combustor 20 is also obtained in such a way that a second injection device 30 injects fuel, such as methanol, into the catalyst combustor 20 to catalytically burn the fuel.

The raw fuel gas evaporated in the fuel evaporator 2 is transferred to the reformer 3 and is reacted over the solid catalyst so as to be reformed into hydrogen-enriched fuel gas. The hydrogen-enriched fuel gas produced at the reformer 3 is then transferred to the CO remover 4 to remove carbon monoxide within the gas, and thereafter supplied to the fuel cell 6, where hydrogen within the fuel gas is reacted with oxygen contained in the air, which is compressed by the air compressor 5 as an oxidant supplying means, so as to generate electricity. The exhaust gas reacted at the fuel cell 6 is transferred to the gas/liquid separator 7 to separate and remove moisture, and is again catalytically burned at the catalyst combustor 20 to be used as an evaporation heat source of the fuel evaporator 2.

Figure 2:
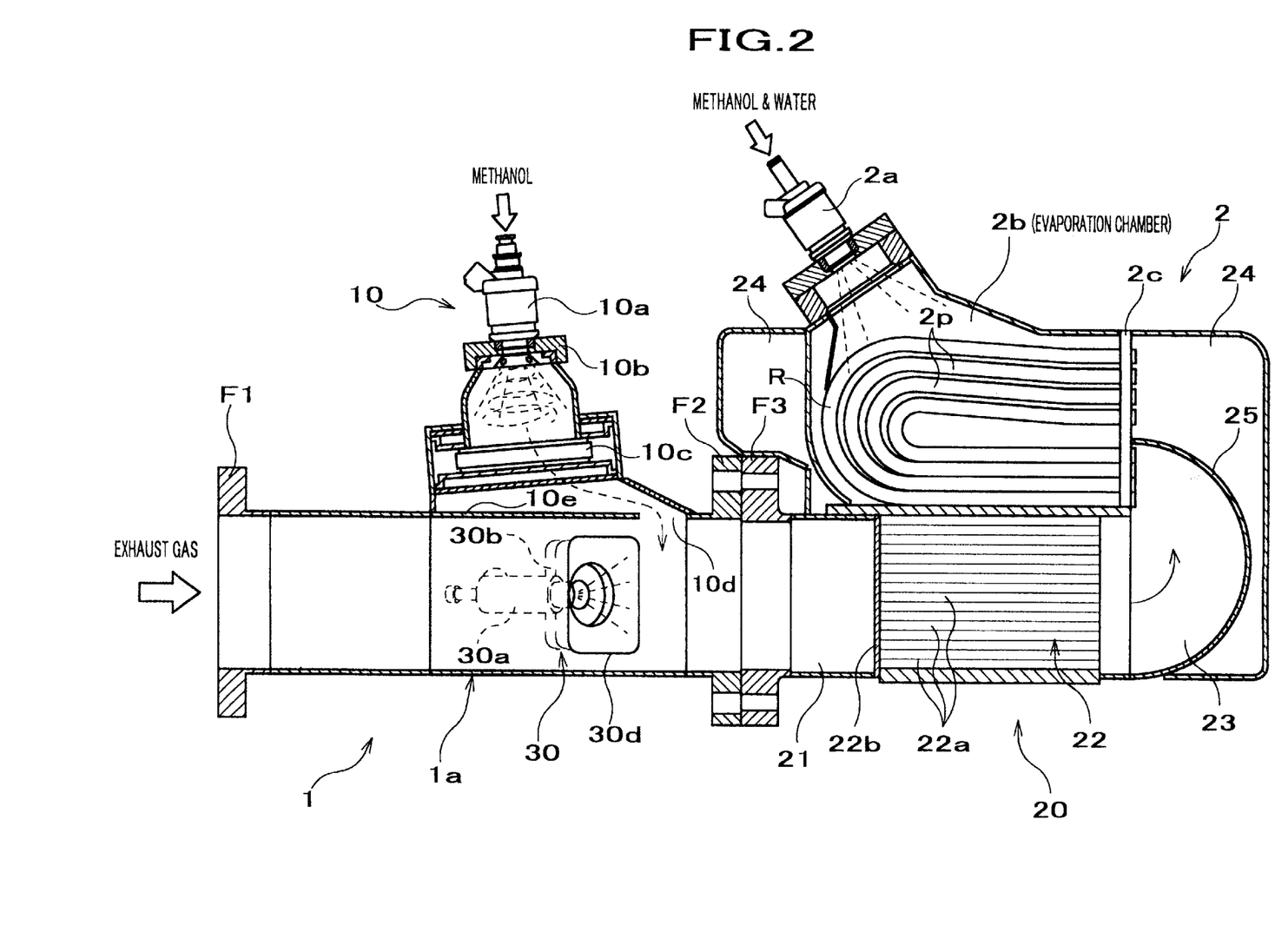
FIG. 2 is a side sectional view showing one embodiment of a warm-up apparatus for a fuel evaporator according to the present invention.

With reference to FIG. 2, one preferred embodiment of the warm-up apparatus for the fuel evaporator will be described.

As shown in FIG. 2, the warm-up apparatus 1 for the fuel evaporator 2 mainly comprises:

the exhaust gas passage 1a that is a piping for transferring the exhaust gas discharged from the fuel cell 6 into the catalyst combustor 20 and having flange portions F1, F2 at both ends;

the catalyst combustor 20 provided below the evaporation chamber 2b of the fuel evaporator 2 and flange-jointed at its inlet port 21 to the flange portion F2 positioned at the downstream side of the exhaust gas passage 1a, the catalyst combustor 20 catalytically burning exhaust gas or fuel, such as methanol, over the combustion catalyst 22a to generate combustion gas to be used as an evaporation heat source;

the combustion gas transferring device 10 positioned on one side of the exhaust gas passage 1a and mainly used for warming up the catalyst combustor 20, the combustion gas transferring device 10 including an injector 10a as a fuel injection portion, an air injection nozzle 10b or a swirler generating a swirl flow of air, the combustion catalyst 10c for burning a mixture of fuel and air and generating combustion gas for warming up the catalyst combustor 20, and an outlet 10d for the combustion gas, and the combustion gas, which is produced by injecting fuel from the injector 10a onto the combustion catalyst 10c and catalytically burning the fuel, being directly transferred from the combustion gas outlet 10d into the catalyst combustor 20; and the fuel injection device 30 positioned on one side of the exhaust gas passage 1a and installed at a position where the fuel can be directly injected onto the surface of the combustion catalyst 22a of the catalyst combustor 20 when the combustion catalyst 22a is thermally activated.

The exhaust gas passage 1a is a piping for transferring the exhaust gas discharged from the fuel cell 6 onto the combustion catalyst 22a of the catalyst combustor 20 and having flange portions F1, F2 at both ends. The exhaust gas transferring passage 1a is provided with the combustion gas outlet 10d as an opening for supplying the combustion gas generated at the combustion gas transferring device 10 to the catalyst combustor 20.

The combustion gas outlet 10d opens toward the catalyst combustor 20 to effectively supply combustion gas onto the combustion catalyst 22a of the catalyst combustor 20.

The combustion gas outlet 10d is formed, looking at the inlet port 21 of the catalyst combustor 20 from the combustion catalyst 10c of the combustion gas transferring device 10, such that when the combustion catalyst 22a of the catalyst combustor 20 is heated to high temperatures during the steady driving, the surface of the heated catalyst is hardly seen.

In this configuration of the combustion gas outlet 10d, the combustion catalyst 10c of the combustion gas transferring device 10 is not heated due to the radiation heat transfer from the combustion catalyst 22a.

A cover plate 10e is provided at the exhaust gas passage 1a for partly blocking a flow of the combustion gas from the combustion gas transferring device 10. The cover plate 10 extends from the wall of the exhaust gas passage 1a along the flow of the exhaust gas. Provided downstream of the cover plate 10e (viz. right end side in FIG. 2) is an opening for the combustion gas outlet 10d of the combustion gas transferring device 10.

In this arrangement of the cover plate 10e, the following effects can be achieved.

(1) Providing the cover plate 10e prevents the flow of the exhaust gas from being drawn toward the combustion gas transferring device. Therefore, the exhaust gas does not burn due to contact with the combustion catalyst 1c of the combustion gas transferring device 10.

(2) Because the cover plate 10e extends from the wall of the exhaust gas passage 1a along the flow of the exhaust gas, the cross-sectional area of the exhaust gas passage 1a is substantially constant throughout the lengthwise direction. Therefore, pressure loss of the exhaust gas passage 1a becomes smaller and a drift flow hardly occurs, leading to smooth flow of the exhaust gas toward the catalyst combustor 20.

Further, in comparison with the constitution without the cover plate 10e, the combustion catalyst 10c of the combustion gas transferring device 10 is not subject to the radiation heat transfer from the combustion catalyst 22a of the catalyst combustor 20 during the steady driving. For this reason, backfire due to the exhaust gas to be burned by the combustion catalyst 10c of the combustion gas transferring device 10 can be prevented in a more reliable manner.

An injector 30a of the fuel injection device 30 injects fuel, and the fuel is further atomized and dispersed by an air injection nozzle 30b or a swirler for generating a swirl flow of air. The atomized and dispersed fuel is then supplied to the catalyst combustor 20 through a fuel outlet 30d.

The fuel outlet 30d opens toward the catalyst combustor 20 to effectively supply fuel onto the combustion catalyst 22a of the catalyst combustor 20.

The catalyst combustor 20 is provided in close contact with and just below the evaporation chamber 2b of the fuel evaporator 2. The catalyst combustor 20 is a combustor for catalytically burning exhaust gas (fuel mixture of hydrogen and air) of the fuel cell 6 or fuel injected from the fuel injection device 30 and generating combustion gas as an evaporation heat source of the fuel evaporator 2. A catalyst layer 22 has a rectangular cross section, and a honeycomb-shaped catalyst is filled within the layer. A platinum series catalyst is used as a catalyst. The use of metal honeycomb catalyst improves the heat conduction characteristics. As a carrier, silica and alumina series carriers are used in general. At the front and the rear of the catalyst layer 22, an inlet 21 with a flange portion F3 and an outlet 23 are formed. The inlet 21 is for introducing exhaust gas into the catalyst combustor 20. The outlet 23 is formed by a semicircular separation plate 25, which divides the inside of the combustion gas passage in such a way that when the high temperature combustion gas generated at the combustion layer 22 flows downward, the flow direction of the combustion gas is changed through 180°.

Further, a perforated plate 22b is provided at the inlet of the catalyst layer 22 for regulating the flow of the combustion gas while uniformly transferring the combustion gas from the combustion gas transferring device 10 into the catalyst layer 22. Preferably, the perforations are provided at the same positions with the transverse cross-section of the piping upon filling the fuel combustor 20 with the combustion catalyst 22a. The perforated plate 22b is preferably a punching metal or a plate having slits. The perforated plate 22b is made of stainless steel for the purpose of improving corrosion resistance. Instead of the perforated plate 22, the piping may be filled with a filler to provide a certain pressure loss.

Providing the perforated plate 22b improves the dispersibility of the exhaust gas as well regulates the flow of the exhaust gas. Also, backfire of the exhaust gas during the steady driving can be prevented.

The injector 10a, the air injection nozzle 10b and the combustion catalyst 10c, which form the combustion gas transferring device 10, will be described.

The injector 10a as a fuel injection portion is an injection device in the form of a one-fluid nozzle for injecting and atomizing fuel, such as methanol. The fuel injection quantity can be controlled either by the back pressure of the nozzle (i.e. the fuel injection quantity is in proportion to the square root of the back pressure) or the injection period.

Figure 3A:
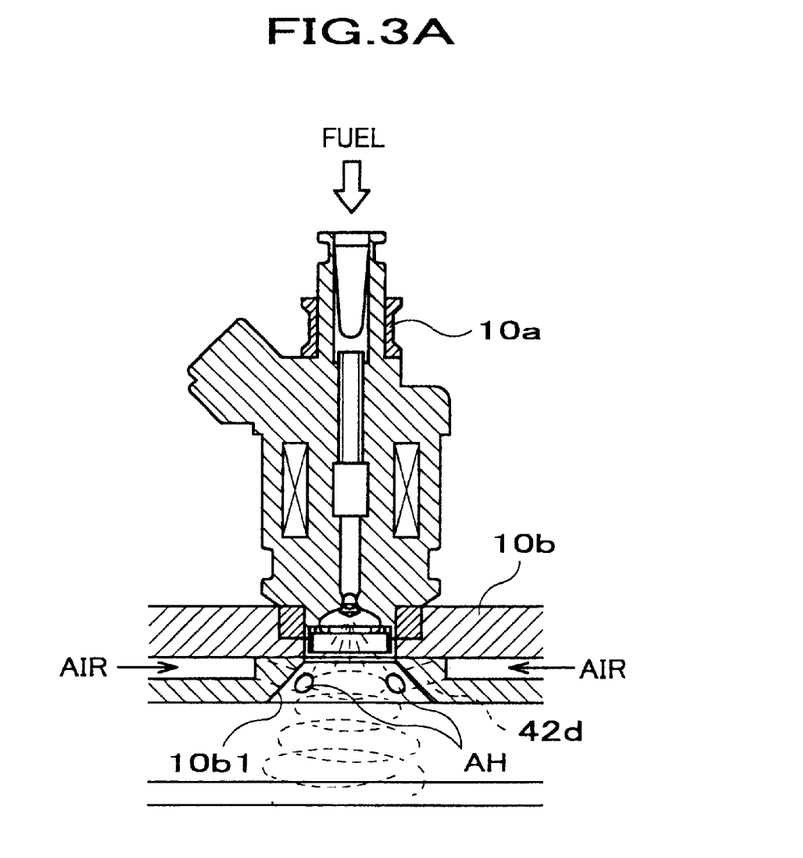
FIG. 3A shows a constitution of an air injection nozzle and an air injection passage according to the present invention.
Figure 3B:
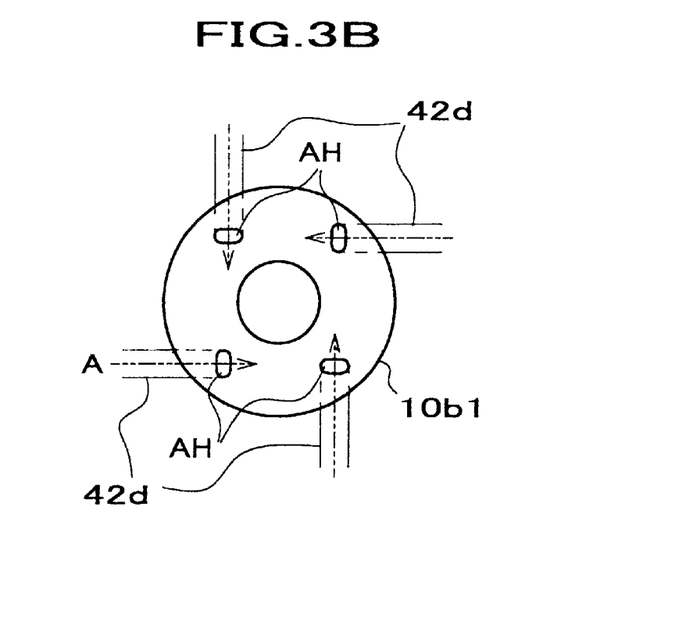
FIG. 3B is a plan view showing an air injection cone of the air injection nozzle.

The air injection nozzle 10b or swirler generates a swirl flow, such as shown in FIG. 3A, so as to make the mixing ratio of fuel in the form of droplets to air as gas uniform. The air injection nozzle 10b allows gases other than air, and for example, fuel gas may be flown into the nozzle 10b. With reference to FIGS. 3A and 3B, constitution of the air injection nozzle 10b will be described.

The air injection nozzle 10b mainly comprises a frustum conical air injection cone 10b1 and air conducting tubes 42d for guiding air to air injection holes AH formed in the air injection cone 10b1.

Four air injection holes AH are spaced apart in a radial direction of the air injection cone 10b1. All the air injection holes AH have the same open area.

The air injection hole AH is an oblong aperture. When looking from the top, the air injection holes AH are provided symmetrically around the center of the air injection cone 10b1 so that two pairs of holes AH extending diagonally across the center are apart from each other at 90 degrees.

In the above air injection nozzle 10b or swirler, when injecting air through the air conducting tubes 42d and the air injection holes AH into the inside of the air injection cone 10b1, an air current swirling in one direction occurs in the air injection cone 10b1. In the example shown in FIG. 3B, a swirl flow in the counterclockwise direction occurs.

Fuel, such as methanol, injected from the injector 10a is merged with the swirl flow, and the fuel is injected onto the combustion catalyst 10c while swirling together with the air. Because the fuel swirls with air and it takes time before arriving at the combustion catalyst 10c, sufficient time can be obtained for atomizing and dispersing the fuel. As a result, composition of the combustion gas generated at the combustion catalyst 10c becomes uniform. Further, in comparison with a combustion burner without a combustion catalyst, it is possible to burn the fuel with smaller air/fuel ratio, leading to reduced amount of the generated exhaust gas.

The combustion catalyst 10c of the combustion gas transferring device 10 will be described.

The combustion catalyst 10c is electrically heated. The combustion catalyst is based on, as a substrate, an iron-chromium made stainless steel whose electric resistance is enhanced by the expanded metal process. The substrate has a heat resistance glass film or a passivation film formed on the surface thereof, leading to high corrosion resistance. The passivation film is formed by the heat treatment under a particular atmosphere. In the combustion catalyst used herein, a platinum series metal is carried as an active ingredient.

This enables to improve a function as an electric heating element and workability as a catalyst substrate, in comparison with a conventional method, which heats a ceramic made substrate by a separate heat source.

When electrically connected, the combustion catalyst 10c intensively heats fine regions spattered on the upstream end surface of the combustion catalyst 10c. Electrically heated regions are small and quickly rising to the catalytically activating temperature (for example 3 to 5 seconds after conducting electricity) even with low electric power application, and great combustion heat is generated due to oxidation reaction of the fuel (combustion reaction).

Accordingly, it is possible to reduce the time for rising to the activated temperature, at which the combustion catalyst 10c is thermally activated, and the size of the catalyst device becomes smaller. Further, even at the cold start, clean exhaust gas is emitted.

The fuel injection device 30 mainly comprises an injector 30a, an air injection nozzle 30b substantially the same as the above air injection nozzle 10b, and a fuel outlet 30d toward the exhaust gas passage 1a. The fuel injection device 30 is positioned on one side of the exhaust gas passage 1a and is installed at a position where the fuel, such as methanol, can be directly injected onto the combustion catalyst 22a of the catalyst combustor 20. Only one fuel injection device 30 is illustrated in FIG. 2, however, when necessary, a plurality of fuel injection devices 30 may be used to inject the fuel entirely over the upstream end surface of the combustion layer 22 of the catalyst combustor 20.

When the combustion catalyst 22a of the catalyst combustor 20 is thermally activated, it is possible to stop to conduct electricity through the combustion catalyst 10c of the combustion gas transferring device 10 while injecting fuel, such as methanol, from the injector 30a, and then the injector 10a of the combustion gas transferring device 10 may start to inject fuel, such as methanol, so that two injectors 10a, 30a inject fuel onto the upstream end surface of the combustion layer 22 of the catalyst combustor 20.

Next, with reference to FIG. 2, the manner of operation of the aforementioned warm-up apparatus for the fuel evaporator according to the present invention will be described. Description will be made at the time of activation (cold start) and at the time of malfunction.

1. Warming-up at the Start (cold start)

(A) Conducting electricity through the combustion catalyst 10 of the combustion gas transferring device 10.

(B) Supplying air required for burning fuel to the air injection nozzle 10b or swirler during the step (A).

(C) Supplying fuel, such as methanol, to the injector 10a when the surface of the combustion catalyst 10c of the combustion gas transferring device 10 rises over a certain temperature, for example 200° C., and thereafter injecting the fuel from the injector 10a onto the combustion catalyst 10c. When do so, the fuel is merged with the swirl flow made by the air injection nozzle 10b and is appropriately atomized and dispersed.

(D) The combustion gas generated by catalytically burning the fuel, such as methanol, at the combustion catalyst 10c of the combustion gas transferring device 10 has a uniform composition. The combustion gas is guided into the inlet 21 of the catalyst combustor 20 through the exhaust gas passage 1a. Conducting electricity through the combustion catalyst 10c is then stopped while the injector 10a of the combustion gas transferring device 10 keeps on injecting the fuel onto the combustion catalyst 10c.

(E) The supplied combustion gas warms up the catalyst layer 22 of the catalyst combustor 20, and when the catalyst layer 22 rises over a certain temperature, for example 120° C., at which the combustion catalyst 22a is thermally activated, injecting the fuel onto the combustion catalyst 10c of the combustion gas transferring device 10 is stopped.

(F) Injecting fuel, such as methanol, from the injector 30a of the fuel injection device 30, and the fuel, which is merged with air for combustion through the air injection nozzle 30b or swirler and is appropriately atomized and dispersed, is further supplied to the combustion catalyst 22a of the catalyst combustor 20 through the exhaust gas passage 1a.

(G) The fuel is catalytically burned with the combustion catalyst 22a of the catalyst combustor 20, and combustion gas used as an evaporation heat source of the combustion evaporator 2 is generated. The combustion gas is supplied from the bottom to the top through the plurality of U-shaped heating medium tubes 2p fixed to the tube plate 2c within the evaporation chamber 2b of the fuel evaporator 2, so as to warm up the evaporation chamber 2b.

(H) When the combustion gas passing through the fuel evaporator 2 (viz. the combustion gas at the combustion gas outlet 24) rises over a certain temperature, for example 200° C., suitable for evaporation, the raw fuel injector 2a injects raw fuel liquid, such as a mixture of methanol and water, on the outer surfaces of the heating medium tubes 2p within the evaporation chamber 2b.

(I) When the raw fuel gas that is made by the evaporation of the raw fuel liquid generated at the evaporation chamber 2b rises to a certain temperature, for example 180° C., suitable for reformation at the following reformer 3, the warm-up of the fuel evaporator 2 is completed.

As mentioned above, the combustion catalyst 10c quickly rising to the catalyst activation temperature is provided within the combustion gas transferring device 10, and with the use of the combustion catalyst 10c fuel is catalytically burned to generate combustion gas, and then the catalyst combustor 20 is warmed up by this combustion gas.

Next, fuel injected by the second injection means 30 is catalytically burned at the combustion catalyst 22a of the catalyst combustor 20 to generate combustion gas as an evaporation heat source of the fuel evaporator 2, and the fuel evaporator 2 is warmed up. Because the warming-up procedure is separated into two steps, the warm-up time of the fuel evaporator can be reduced. Further, because fuel is burned at low temperatures with the aid of the combustion catalyst 10c, warming-up is carried out while emitting a clean exhaust gas containing little amount of toxic substances, such as $NO_x$ (nitrogen oxides).

2. Warming-up of the Fuel Evaporator at the Time of Malfunction

For example, when liquid pool is occurred at the inlet 21 of the catalyst combustor 20, likewise the warming-up at the start, the above steps (A) to (I) are carried out for quickly generating combustion gas. Liquid pool can be overcome because the generating combustion heat is used to warm the inlet 21 of the catalyst combustor 20.

Accordingly, it is possible to provide a warm-up apparatus for the fuel evaporator, which includes an actuation/warm-up system enabling quick and reliable warm-up operation, which is compact with small electricity consumption, and which enables clean exhaust gas emission.

While the invention has been described in detail and with reference to specific embodiments thereof, it will be apparent to one skilled in the art that various changes and modifications can be made therein without departing from the spirit and scope thereof.

For example, the fuel injection portion may be any known device for receiving and injecting fuel when necessary, and is not limited to the injector 10a.

What is claimed is:

1. A warm-up apparatus for a fuel evaporator comprising:
a catalyst combustor for catalytically burning exhaust gas from a fuel cell to produce combustion gas and supplying said fuel evaporator which evaporates raw fuel liquid with the produced combustion gas as an evaporation heat source;
an exhaust gas passage for transferring exhaust gas to the catalyst combustor;
a combustion gas transferring device including a fuel injection portion and a combustion catalyst, and injecting fuel from said fuel injection portion onto said combustion catalyst, where the fuel is catalytically burned to produce combustion gas, and thereafter transferring the produced combustion gas to said catalyst combustor, wherein said combustion gas transferring device is positioned on one side of said exhaust gas passage.

2. A warm-up apparatus for a fuel evaporator according to claim 1, wherein said combustion gas transferring device comprises a swirler generating a gaseous swirl flow with regard to the fuel injected.

3. A warm-up apparatus for a fuel evaporator according to claim 1, wherein said combustion gas transferring device includes a combustion gas outlet which opens from an upstream of a flow of the exhaust gas toward the catalyst combustor.

4. A warm-up apparatus for a fuel evaporator according to claim 3, wherein said combustion gas outlet is provided at a position where the combustion catalyst of said combustion gas transferring device is not heated due to radiation heat transfer from a combustion catalyst of said catalyst combustor while the combustion catalyst of said catalyst combustor rises to high temperatures during the steady driving.

5. A warm-up apparatus for a fuel evaporator according to claim 1, wherein said combustion gas transferring device comprises an injector as the fuel injection portion, an air injection nozzle, the combustion catalyst and a combustion gas outlet.

6. A warm-up apparatus for a fuel evaporator according to claim 5, wherein said air injection nozzle is a swirler generating a gaseous swirl flow with regard to the fuel injected.

7. A warm-up apparatus for a fuel evaporator according to claim 1, wherein said exhaust gas passage is provided with a cover plate, which extends from a wall of the exhaust gas passage along a flow of the exhaust gas and partly blocks the flow of the exhaust gas.

8. A warm-up apparatus for a fuel evaporator according to claim 1, wherein the combustion catalyst of said combustion gas transferring device is based on, as a substrate, an expanded metal made of iron-chromium made stainless steel.

9. A warm-up apparatus for a fuel evaporator according to claim 1, wherein a fuel injection device is positioned on one side of said exhaust gas passage.

10. A warm-up apparatus for a fuel evaporator according to claim 9, wherein said fuel injection device is capable of directly injecting fuel onto the combustion catalyst of said catalyst combustor when the combustion catalyst is thermally activated.

11. A warm-up apparatus for a fuel evaporator according to claim 10, wherein said fuel injection device comprises an injector, an air injection nozzle, and a fuel outlet to the exhaust gas passage.

12. A warm-up apparatus for a fuel evaporator according to claim 11, wherein said air injection nozzle is a swirler generating a gaseous swirl flow with regard to the fuel injected.

13. A warm-up apparatus for a fuel evaporator according to claim 1, wherein an inlet of said catalyst in the form of a layer is provided with a stainless steel made perforated plate for regulating a flow of the combustion gas while uniformly transferring the combustion gas from said combustion gas transferring device into the catalyst layer.

* * * * *